United States Patent
Capircio et al.

(10) Patent No.: US 8,009,163 B2
(45) Date of Patent: Aug. 30, 2011

(54) GRAPHICS GENERATION DEVICE COMPRISING MEANS FOR MONITORING ITS OPERATION

(75) Inventors: Patrice Capircio, Le Taillan Medoc (FR); Eric Filliatre, Merignac (FR)

(73) Assignee: Thales (FR)

( * ) Notice: Subject to any disclaimer, the term of this patent is extended or adjusted under 35 U.S.C. 154(b) by 977 days.

(21) Appl. No.: 11/912,813

(22) PCT Filed: Apr. 20, 2006

(86) PCT No.: PCT/EP2006/061720
§ 371 (c)(1),
(2), (4) Date: Oct. 26, 2007

(87) PCT Pub. No.: WO2006/114388
PCT Pub. Date: Nov. 2, 2006

(65) Prior Publication Data
US 2008/0211814 A1  Sep. 4, 2008

(30) Foreign Application Priority Data
Apr. 26, 2005  (FR) .................................... 05 04195

(51) Int. Cl.
*G06T 15/00* (2011.01)
(52) U.S. Cl. ........ 345/418; 345/157; 345/505; 345/633; 701/14; 701/16; 713/187; 713/189; 715/851

(58) Field of Classification Search .................. 345/418, 345/633, 157, 419, 505; 701/14, 16; 713/187, 713/189; 715/851
See application file for complete search history.

(56) References Cited

U.S. PATENT DOCUMENTS

| | | | |
|---|---|---|---|
| 6,112,141 A * | 8/2000 | Briffe et al. | 701/14 |
| 6,727,924 B1 * | 4/2004 | Anderson | 715/851 |
| 6,894,687 B1 * | 5/2005 | Kilgard et al. | 345/419 |
| 6,922,703 B1 * | 7/2005 | Snyder et al. | 345/633 |
| 6,965,816 B2 * | 11/2005 | Walker | 701/16 |
| 7,379,048 B2 * | 5/2008 | Anderson | 345/157 |
| 7,565,551 B2 * | 7/2009 | Kirovski | 713/189 |
| 7,777,748 B2 * | 8/2010 | Bakalash et al. | 345/505 |
| 2002/0080143 A1 | 6/2002 | Morgan et al. | |
| 2004/0162989 A1 | 8/2004 | Kirovski | |

FOREIGN PATENT DOCUMENTS
WO    0056008    9/2000

* cited by examiner

*Primary Examiner* — Phu Nguyen
(74) *Attorney, Agent, or Firm* — Lowe Hauptman Ham & Berner, LLP

(57) ABSTRACT

A device for the graphical generation of symbologies intended for a display screen, the device having functions for the generation of symbology elements and means for monitoring its correct operation. The monitoring of correct operation allowing the use of certain of the functions for the generation of symbology elements to be prohibited and micro-images dedicated to the monitoring of the functions to be generated and controlled.

13 Claims, 5 Drawing Sheets

| Programming rules for the display of critical parameters (2D Symbology) | OpenGL Functions |
|---|---|
| Resetting of the context applicable upon each cycle | |
| No macro-functions used | GLUT |
| No mathematical evaluators used | NURBS |
| No recurrent macro-functions in memory | Display List |
| No recurrent data in memory | Vertex Array |
| No pixel matrices used | bit maps |
| No textures used | texture |
| No accumulation buffer used | Accumulation buffer |
| "Lighting" function disabled | Lighting |
| Function for detection of invisible parts of objects disabled | Culling |
| "Fog effect" function disabled | Fog |
| Scissoring buffer disabled | Scissoring |
| Transparency test disabled | Alpha Test |
| No increase of the palette by colour mixing | Dithering |

| Programming rules for the display of critical parameters (2D Symbology) | OpenGL Functions |
|---|---|
| Resetting of the context applicable upon each cycle | |
| No macro-functions used | GLUT |
| No mathematical evaluators used | NURBS |
| No recurrent macro-functions in memory | Display List |
| No recurrent data in memory | Vertex Array |
| No pixel matrices used | bit maps |
| No textures used | texture |
| No accumulation buffer used | Accumulation buffer |
| "Lighting" function disabled | Lighting |
| Function for detection of invisible parts of objects disabled | Culling |
| "Fog effect" function disabled | Fog |
| Scissoring buffer disabled | Scissoring |
| Transparency test disabled | Alpha Test |
| No increase of the palette by colour mixing | Dithering |

| N° | Security barriers | Process commands | Evaluator | GLUT | Command Processor | Cache Display List | Cache Vertex Array | ModelView transformation | Texture coordinate | Lighting and colouring | Primitive Assembly | Projection transformation | Clipping | Perspective division | Culling | Rasterization | Texturing | Fog Calculation | Antialiasing | Scissoring | Alpha Test | Stencil test | Depth-buffer test | Blending | Dithering | Logical operations | Writing colour buffers | Clearing buffers | Accumulating images | Masking buffer | Selecting Buffers | Swapping buffers |
|---|---|---|---|---|---|---|---|---|---|---|---|---|---|---|---|---|---|---|---|---|---|---|---|---|---|---|---|---|---|---|---|---|
| 1 | Micro image 1 (FIFO) | X | | | X | | | | | | | | | | | X | | | X | | | | | | | | | | | | | |
| 2 | Micro image 2 (Vertex) | X | | | X | | | X | | | | X | | X | | X | | | X | | | | | | | | | X | | | | |
| 3 | Micro image 3 (Primitive) | X | | | X | | | | | | X | | | | | X | | | X | | | | | | | | | X | | | | |
| 4 | Micro image 4 (Clipping) | X | | | X | | | | | | | | X | | | X | | | X | | | | | | | | | X | | | | |
| 5 | Micro image 5 (Stencil) | X | | | X | | | | | | | | | | | X | | | X | | | X | | | | | | X | | | | |
| 6 | Micro image 6 (depth buffer) | X | | | X | | | | | | | | | | | X | | | X | | | | X | | | | | X | | | | |
| 7 | Micro image 7 (blending) | X | | | X | | | | | | | | | | | X | | | X | | | | | X | | | | X | | | | |
| 8 | Micro image 8 (logical ops) | X | | | X | | | | | | | | | | | | | | | | | | | | | X | | X | | | | |
| 9 | Micro image n° 9 (FB permutation) | X | | | X | | | | | | | | | | | | | | | | | | | | | | X | X | | | X | X |
| 10 | Micro image n°10 (FB Corruption) | X | | | X | | | | | | | | | | | | | | | | | | | | | | | | | | X | | |
| 11 | Get MATRIX monitoring | | | | | | | X | | | X | X | | | | | | | | | | | | | | | | | | | | |
| 12 | Get Current COLOUR monitoring | | | | | | | | | | | | | | | | | | | | | | | | | | X | | | | | |
| 13 | Programming rules | | X | X | | X | X | | X | X | | | | | X | | X | X | | X | X | | | | X | | | | X | | | X |

GRAPHICS GENERATION DEVICE COMPRISING MEANS FOR MONITORING ITS OPERATION

CROSS-REFERENCE TO RELATED APPLICATIONS

The present Application is based on International Application No. PCT/EP2006/061720, filed Apr. 20, 2006, which in turn corresponds to France Application No. 05 04195, filed Apr. 26, 2005, and priority is hereby claimed under 35 USC §119 based on these applications. Each of these applications are hereby incorporated by reference in their entirety into the present application.

BACKGROUND OF THE INVENTION

1. Field of the Invention

The field of the invention relates to the operational security, safety and reliability of Man/Machine Interface systems displaying information in the form of graphics or symbology.

The field of application is more particularly that of cockpit display systems on board aircraft. This type of system is designed to display critical information for the piloting or the navigation of the aircraft. The erroneous display of certain parameters may lead to catastrophic situations for the operational safety of the aircraft. Since the basic integrity or the reliability of the display system is not sufficient to guarantee the demands on safety and security, dedicated monitoring mechanisms designed to detect possible display errors need to be implemented.

Clearly, in view of the safety and security constraints specific to this field, the main target field for this type of application is aeronautics. The invention may, however, be applied to any Man/Machine Interface system requiring a high degree of security or reliability and comprising graphical displays, such as the systems employed for rail transport or the centralized control and command systems for civil or military applications.

2. Description of the Prior Art

There exist several solutions for ensuring the operational safety and reliability of a display system.

Historically, the operational reliability of an onboard display system is principally ensured by a feedback mechanism. The principle is illustrated in FIG. 1. A display system 1 is disposed between one or more sensors 2 and a display screen 3. It essentially comprises 3 sub-systems which are:
- A device 4 for acquiring parameters coming from the sensor or sensors 2 which will be denoted measured-parameters;
- A device 5 for processing the said parameters;
- A graphics generation device 6 providing the interface with the display screen 3.

The feedback mechanism also comprises 3 sub-systems which are:
- A second device 17 for acquiring parameters coming from the sensor or sensors 2, identical to the previous device 4 and operating in parallel with it;
- A computing device 8 which, starting from the data produced by the graphics generation device, recalculates in reverse the original parameters coming from the sensors 2 which will be denoted calculated-parameters;
- A monitoring device 9 which provides the comparison between the measured-parameters and the calculated-parameters.

This monitoring technique has a certain number of drawbacks and limitations:

Initially designed to ensure the integrity of cathode-ray tube display systems, since going over to liquid-crystal, or LCD, screens, this technique no longer covers the entirety of the display system, requiring the implementation of additional security mechanisms.

The asynchronism existing between the display system and its monitoring means that a strict comparison is not possible, requiring the introduction of either corrections δ or monitoring inhibition mechanisms, if the dynamic range of the input parameter is too large.

The inverse algorithm possesses its own noise which does not allow a strict comparison. The performance of the detection therefore rests on the specification of the corrections δ.

This technique requires the ability to sample graphical information of the vector or apex type in order to supply the monitoring system. This information is not available with certain technologies. Indeed, it is not possible to access this type of information with components of the GPU (Graphics Processing Unit) type that are widely employed for generating graphical functions. It is not therefore adapted to the new display architectures. As a result, this technique is neither generic nor portable with regard to the new generation of graphics generation technologies.

The computing load required for the inverse calculation is significant.

The very principle of the inverse algorithm makes the solution totally dedicated to the displayed symbology and is not generic with regard to the various possible applications.

Another solution consists in implementing two dissimilar Graphics Generation channels denoted channel 1 and channel 2:
- Channel 1: nominal channel identical to the previous display system and generating the whole image to be displayed including the critical and non-critical symbols.
- Channel 2: monitoring channel generating an image limited to the critical symbols. This channel is implemented in a dissimilar manner to the nominal channel 1.

The objective of the monitoring is to verify that the two channels really have generated the same image for the critical symbols. Two solutions are implemented:
- Implementation of a function for comparing the two images generated, or
- Superimposition on the screen of the two images. In the case of a difference, this will be detected visually by the human operator using this screen.

This solution has the following drawbacks:
- Partial verification of the display system, only the Graphics Generation part of the functional system being operationally secured.
- Increase in equipment costs by implementation of hardware and software resources necessary for the second dissimilar channel.
- Dependency of the solution on the chosen application, this solution depending on the symbology displayed.
- Complexity and difficulty in the implementation of the function for comparing two images. Indeed, since the graphics algorithms of the two channels are dissimilar, they will not necessarily generate images that are comparable to within a pixel. Moreover, the full image of channel 1 may have different background colors from those of the monitoring channel 2, which makes a simple pixel by pixel comparison very difficult.
- Difficulty in the clarity of the visual effect in the case of a superimposition of images. Indeed, it must be guaranteed that the visual effect is sufficiently obvious so that the operator can easily detect the error under any kind of observational conditions.

SUMMARY OF THE INVENTION

The goal of the invention is to guarantee the display integrity of an onboard display system while at the same time avoiding the previous drawbacks. Furthermore, with respect to the current solutions described hereinabove, this new monitoring mechanism provides a generic solution independent of the type of application and of the images that are displayed. In addition, this new monitoring technique allows the integrity of the new display technologies to be guaranteed, whether they are based on solutions referred to as proprietary, in other words developed specifically for a given application, or whether they are based on commercially available solutions referred to as COTS (Component Off-The-Shelf), the monitoring mechanism that forms the subject of the invention being sufficiently generic and portable with respect to the graphics generation implemented. Generally speaking, components of the COTS type have a relatively short lifetime. It is therefore important to develop a monitoring device that is not linked to the component.

The monitoring principles according to the prior art are all based on the monitoring of graphical information coming from the display system and the verification that this information really does correspond to the input parameters. The heart of the invention is to essentially monitor the correct operation of the graphics generation functions, independently of the data that they are processing.

The invention is more specifically designed to be implemented for graphics generation devices implanted within computer reception structures comprising a CPU, acronym for Central Processing Unit. In this type of architecture, the graphics generation no longer belongs to a particular application but forms an integral part of the reception structure. Thus, a monitoring mechanism for the graphics generation is implemented within the reception structure itself. The definition of the applications therefore becomes independent of the graphics generation. In order that the applications may, if necessary, implement their own monitoring process, each reception structure offers the possibility of dialogue with another reception structure, which dialogue is also referred to as cross talk.

More precisely, the invention relates to a device for the graphical generation of symbologies intended for a display screen, the said device comprising functions for the generation of symbology elements and means for monitoring its correct operation, characterized in that the said monitoring means comprise, at least:

First means allowing the use of certain of the said functions for the generation of symbology elements to be prohibited;

Second means allowing micro-images dedicated to the monitoring of the said functions to be generated and controlled.

Advantageously, the prohibited functions are functions that are capable of generating recurrent symbol elements or macro-functions comprising a plurality of elementary functions for generating symbology elements.

Advantageously, the device comprises a memory comprising a first region intended for the storage of the symbology and a second region, the micro-images being generated in this second region.

Advantageously, the device comprises a memory comprising a first region intended for the storage of the symbology, the second monitoring means allowing micro-images to be generated in this first region during a short period of time compared with the refresh time of the symbology on the display screen.

Furthermore, the device additionally comprises third monitoring means allowing certain state variables internal to the graphics generation device to be monitored, the said third means comprising means for computing the said internal state variables independent of those of the graphics generation device.

The invention also relates to a method for monitoring the correct operation of a graphics generation device comprising a memory comprising a first region intended for storing the symbology, the micro-images being generated within this first region, the said method comprising at least the following steps:

Tracing of the micro-image within the first region;
Calculation of a mathematical signature for the said micro-image;
Comparison of the calculated signature with an expected signature;
Erasing of the micro-image;
Tracing of the operational image.

Furthermore, the device can be of the GPU type, acronym for Graphics Processing Unit, the graphics generation functions and the monitoring means are integrated with a reception structure comprising a CPU, acronym for Central Processing Unit, and the functions for generation of symbology elements are written in an OpenGL language, acronym for Open Graphics Language.

Advantageously, the display screen is of the LCD type, acronym for Liquid Crystal Display, and the symbology is of the aeronautics type and represents symbols useful at least for the piloting and navigation of aircraft.

BRIEF DESCRIPTION OF THE DRAWINGS

The invention will be better understood and other advantages will become apparent upon reading the description that follows presented in a non-limiting way and thanks to the appended figures, amongst which:

FIG. 3 shows an exemplary implementation of the means according to the invention in the case where the programming language is OpenGL;

FIG. 5 shows an exemplary implementation of the first means according to the invention in the case where the programming language is OpenGL.

DETAILED DESCRIPTION OF THE DRAWINGS

Figure 1:
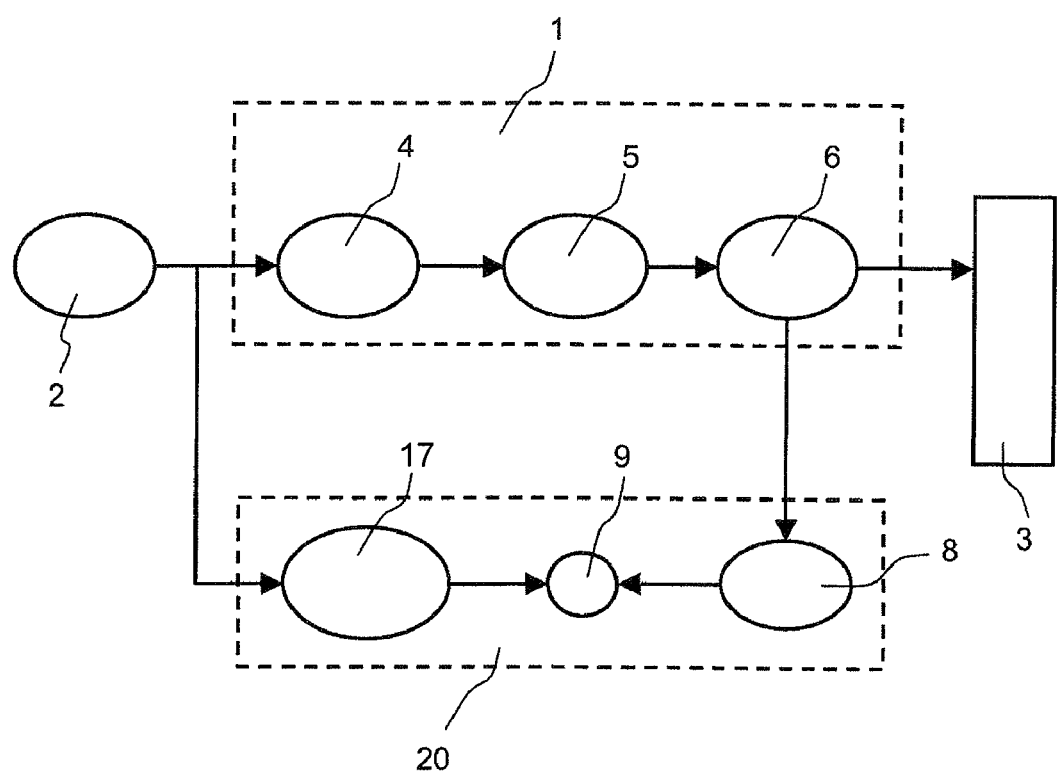
FIG. 1 shows a display system comprising a reliability monitoring device according to the prior art.
Figure 2:
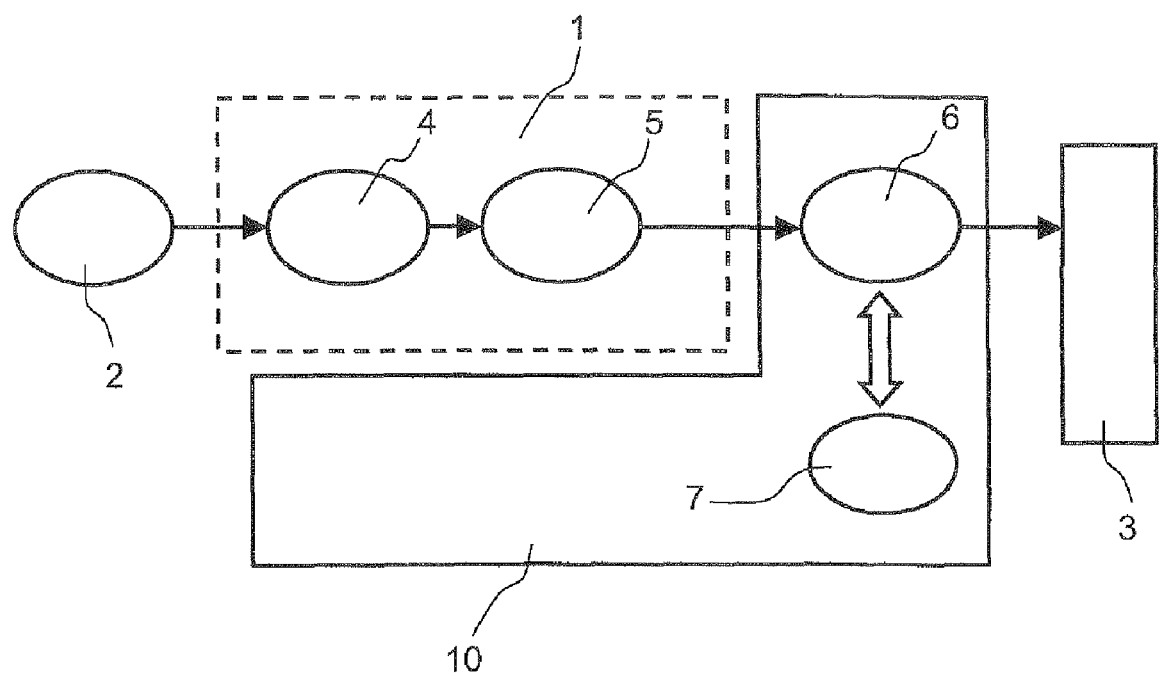
FIG. 2 shows the schematic block diagram of a monitoring device according to the invention.

The invention is more specifically designed to be implemented for graphics generation devices implanted within computer reception structures. In this type of architecture illustrated in FIG. 2, the graphics generation 6 no longer belongs to a particular application but forms an integral part of the reception structure 10. Thus, a monitoring mechanism 7 for the graphics generation 6 is implemented within the reception structure itself. The graphics generation offers a generic interface called API, acronym for Application Programming Interface, with the graphics applications by means of a graphics language. For example, the graphics language can be the standard called OpenGL developed by the company Silicon Graphics or a standard derived from this language.

As was stated, in order to avoid the dependency on the type of graphics solution, the monitoring of the graphics generation is carried out within the functions implemented by the graphics language.

For this purpose, the monitoring means comprise, at least:
First means allowing the use of certain functions for the generation of symbology elements to be prohibited;
Second means allowing micro-images dedicated to the monitoring of the said functions to be generated and controlled.

In the following part of the description, these various means will also be referred to as security barriers.

With regard to the first means, the principles for defining the programming rules are as follows:
Use of graphics functions not making use of data recurring over several image generation cycles;
Use of basic graphics functions and prohibition of the use of high-level mathematical macro-functions;
Use of functions not requiring allocation of dynamic memory;
Use of non-recursive functions.

By way of non-limiting example, a dysfunctional analysis of the functional machine OpenGL has allowed the critical functions to be identified that can generate a non-integrity of the displayed parameters. FIG. 3 is a table representing these critical functions in the case of a '2D' application where the images are traced in 2 dimensions. The right-hand column gives the OpenGL terminology of the critical functions identified and the left-hand column the programming rules allowing the said functions to be disabled.

Figure 4:
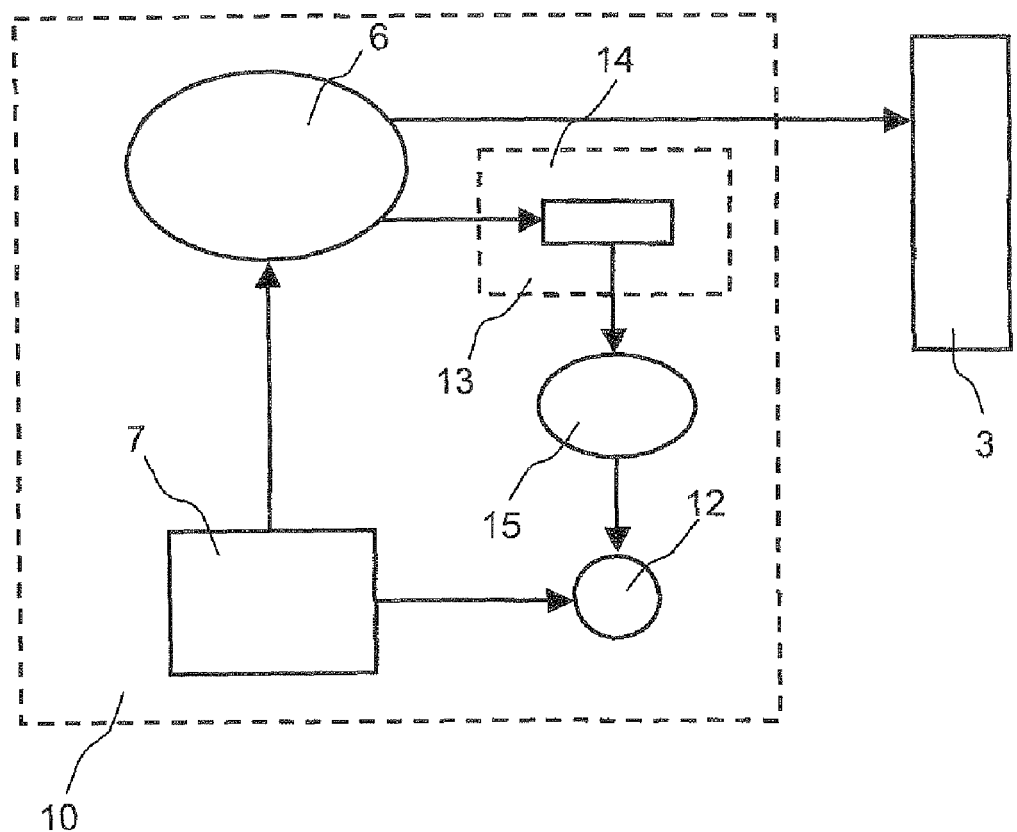
FIG. 4 shows the schematic block diagram of a monitoring device using micro-images.

With regard to the second means, the principle of the monitoring implemented consists in subjecting micro-images to graphics generation. These micro-images are characteristic of the correct operation of the critical functions. This principle is shown in FIG. 4.

Two possibilities exist for displaying these micro-images.

In a first variant, in order not to interfere with the display of the operational image, these micro-images are calculated by the monitoring device 7 then drawn in a region of memory 13 corresponding to an invisible part of the color buffers 14. The reception structure 10 reads these color buffers in order to generate the video sent to the screen 3. When the reception structure reads the invisible part, it does not send these pixels onto the screen but calculates a mathematical signature 15 over the whole of the pixels of the micro-image. It then suffices to verify, by means of the comparison device 12, that this signature conforms to that expected by the monitoring device 7 in order to detect any possible malfunctioning of the graphics generation. The mathematical function that allows the signature to be determined is chosen such that any interference in the micro-image leads to a modification of the signature. This type of function is known by those skilled in the art.

These micro-images consist of a sub-assembly of tests performed during the validation of the graphics generation function.

The main advantage of this solution is that the micro-images generated do not interfere with the final image. However, for certain applications, it may be advantageous to verify the state of the final image. Accordingly, in a second variant, the micro-images are traced within the visible part of the color buffers. In order that the micro image does not appear on the screen, the following sequence is executed:
Tracing of the micro image into visible memory;
Return of the corresponding pixels for signature calculation and verification with respect to the expected signature;
Erasing of the micro-image;
Tracing of the operational image.

In the two cases, the monitoring mechanism is executed on a processing core, that of the application, different from the graphics generation core. This guarantees the principle of segregation between a function and its monitoring.

To these main security barriers may also be added other safety and security mechanisms. In particular, it is possible to monitor certain state variables of the graphics language generation system. The idea is then to re-read, in the graphics component, certain state variables liable to have a critical effect on the operational integrity. For example, in the case of the OpenGL language, the state variables to be monitored are called: "Model/View" matrix, Projection matrix, Current color.

In this case, the monitoring function of the graphics generation performs a dissimilar computation of these state variables allowing the coherence with the values implemented in the graphics component to be verified. Each time that the application modifies one of these state variables, it performs the following operations:
Transmission of this modification to the monitoring function;
Execution of an instruction for reading the state variable in the graphics component and transmission of the result to the monitoring function for comparison.

In order that this monitoring be generic with regard to the applications, a code generator must be used that automatically adds the above processing operations into the application.

By way of non-limiting example, the table in FIG. 5 shows an exemplary implementation of the whole of the means according to the invention in the case where the programming language is OpenGL.

The main functions of the OpenGL programmable controller are grouped by type and disposed in columns. The terminology used is the OpenGL terminology. For example, the first 3 functions of the table denoted as "Process commands", "Evaluator", "GLUT" are implemented in the "Driver" part and are grouped in the first three columns of the table. GLUT is the acronym for Graphics Language Utility Toolkit.

The security barriers are grouped in rows. The first 10 rows relate to the micro-images, rows 11 and 12 relate to the monitoring of the state variables, and the last row relates to the programming rules.

When a security barrier can be applied to a given function, a cross appears in the table at the intersection of the corresponding row and column.

Thus, it is possible to guarantee the reliability of around forty OpenGL functions with a reduced number of security barriers. In addition, certain functions are rendered secure in a redundant manner.

Thus, the monitoring devices according to the invention allow a display system for critical parameters to be implemented with a high level of integrity. These devices are generic with regard to the type of application and portable with regard to the graphics generation technology employed.

With respect to the current solutions, these monitoring devices limit the exchanges of data within the system and reduce the computational loading.

Moreover, by limiting the asynchronism and tolerance problems between systems as far as possible, these devices allow the detection of errors to be substantially improved.

What is claimed is:

1. A graphics generation device for graphical generation of symbologies intended for a display screen, the said graphics generation device comprising:
   functions for generation of symbology elements; and
   a means for monitoring correct operation of the graphics generation device, comprising:
      a first means allowing use of a portion of the said functions for the generation of the symbology elements to be prohibited; and
      a second monitoring means allowing micro-images dedicated to monitoring of the said functions to be generated and controlled.

2. The graphics generation device according to claim 1, wherein the prohibited functions are functions that are capable of generating recurrent symbol elements.

3. The graphics generation device according to claim 1, wherein the prohibited functions are macro-functions comprising a plurality of elementary functions for generating symbology elements.

4. The graphics generation device according to claim 1, comprising a memory comprising a first region intended for storage of the symbology elements and a second region, the micro-images being generated in the second region.

5. The graphics generation device according to claim 1, comprising a memory comprising a first region intended for storage of the symbology elements, the second monitoring means allowing micro-images to be generated in the first region during a short period of time compared with refresh time of the symbology elements on the display screen.

6. The graphics generation device according to claim 1, comprising a third monitoring means allowing a portion of internal state variables of the graphics generation device to be monitored.

7. The graphics generation device according to claim 6, wherein the said third monitoring means comprise means for computing the said internal state variables independent of internal state variables of the graphics generation device.

8. The graphics generation device according to claim 1, the said graphics generation device being Graphics Processing Unit (GPU).

9. The graphics generation device according to claim 1, wherein the functions for generation of symbology elements and the monitoring means are integrated with a reception structure comprising a Central Processing Unit (CPU).

10. The graphics generation device according to claim 1, wherein the functions for generation of symbology elements are written in an OpenGL language, acronym for Open Graphics Language.

11. The graphics generation device according to claim 1, wherein the display screen is of a Liquid Crystal Display (LCD) type.

12. The graphics generation device according to claim 1, wherein the symbology is of an aeronautics type and represents symbols useful at least for piloting and navigation of aircraft.

13. A method for monitoring correct operation of a graphics generation device, comprising the following steps:
   tracing of a micro-image within a first region of a memory, the first region for storage of symbology elements, the micro-image based on a function for generation of a symbology element;
   calculating a mathematical signature for the micro-image;
   comparing the calculated mathematical signature with an expected signature;
   erasing the micro-image form the first region; and
   tracing of an operational image based on the micro-image into a second region of the memory, the operational image in the second region being displayed.

* * * * *